United States Patent
Wang (10) Patent No.: US 9,713,863 B2
(45) Date of Patent: Jul. 25, 2017

(54) AUTOMATIC STEEL-BAR COUPLING HEAD MAKING MACHINE

(71) Applicant: DER FUN PRESTRESSED METAL CO., LTD., Taoyuan (TW)

(72) Inventor: Tien-Fa Wang, Taoyuan (TW)

(73) Assignee: DER FUN PRESTRESSED METAL CO., LTD., Taoyuan (TW)

( * ) Notice: Subject to any disclaimer, the term of this patent is extended or adjusted under 35 U.S.C. 154(b) by 0 days.

(21) Appl. No.: 15/060,695

(22) Filed: Mar. 4, 2016

(65) Prior Publication Data
US 2016/0368107 A1 Dec. 22, 2016

(30) Foreign Application Priority Data

Jun. 17, 2015 (TW) .............................. 104209719 U
Jun. 17, 2015 (TW) .............................. 104209720 U (51) Int. Cl.
*B23P 23/04* (2006.01)
*B21H 3/02* (2006.01)
(Continued)

(52) U.S. Cl.
CPC ................ *B23P 23/04* (2013.01); *B21H 3/02* (2013.01); *B23B 3/065* (2013.01); *B23B 11/00* (2013.01);
(Continued)

(58) Field of Classification Search
CPC ............. Y10T 29/5109; Y10T 29/5114; Y10T 82/2524; B21H 3/02; B23P 23/02;
(Continued)

(56) References Cited

U.S. PATENT DOCUMENTS 1,367,951 A * 2/1921 Eden, Jr. .................. B23G 1/04
470/58
3,165,768 A * 1/1965 Herbkersman .......... B23G 1/22
470/58
(Continued)

FOREIGN PATENT DOCUMENTS

JP 60127035 A * 7/1985 ............... B21H 3/02

*Primary Examiner* — Sunil K Singh
*Assistant Examiner* — Michael Vitale
(74) *Attorney, Agent, or Firm* — Bacon & Thomas, PLLC (57) ABSTRACT

The present invention is to provide an automatic steel bar coupling head making machine including a positioning mechanism, a transverse moving mechanism, a longitudinal moving mechanism, a processing mechanism assembly and a control mechanism, wherein, when a steel bar is positioned between two fixtures of the positioning mechanism and an end of the steel bar presses against a positioning detection rod of the processing mechanism assembly, the processing mechanism assembly sends a start signal to the control mechanism and, upon receipt of the start signal, the control mechanism drives the positioning mechanism, the transverse moving mechanism, the longitudinal moving mechanism and the processing mechanism assembly, for enabling the two fixtures to clamp the steel bar and then enabling the processing mechanism assembly to sequentially perform a first turning, a second turning and a thread rolling on peripheral edge of the steel bar adjacent to the end of the steel bar.

12 Claims, 11 Drawing Sheets

(51) Int. Cl.
*B23B 3/06* (2006.01)
*B23B 11/00* (2006.01)
B23Q 39/02 (2006.01)
B23B 13/12 (2006.01)
B23Q 17/00 (2006.01)

(52) U.S. Cl.
CPC .......... *B23B 13/126* (2013.01); *B23Q 17/003* (2013.01); *B23Q 39/024* (2013.01); *Y10T 29/5114* (2015.01); *Y10T 82/2524* (2015.01)

(58) Field of Classification Search
CPC .... B23Q 39/024; B23Q 39/027; B23B 3/065; B23B 3/162; B23B 3/165; B23B 3/168; B23B 11/00
USPC .................................. 29/27 C, 27 R; 82/129
See application file for complete search history.

(56) References Cited

U.S. PATENT DOCUMENTS

| | | | | |
|---|---|---|---|---|
| 4,122,572 A | * | 10/1978 | Pauls | ........................ B23G 3/08 408/130 |
| 5,885,199 A | * | 3/1999 | Shao | ...................... B23F 17/006 29/27 C |
| 8,800,125 B2 | * | 8/2014 | Stanik | ...................... B21H 3/04 29/27 C |
| 2010/0113172 A1 | * | 5/2010 | Braun | ...................... B21H 3/04 470/57 |

* cited by examiner

AUTOMATIC STEEL-BAR COUPLING HEAD MAKING MACHINE

FIELD OF THE INVENTION

The present disclosure generally relates to a steel-bar coupling head making machine, more particularly to an automatic steel-bar coupling head making machine capable of completing the operation for making a steel bar coupling head precisely and quickly by a consistent process including twice turnings and then thread rolling.

BACKGROUND OF THE INVENTION

The traditional way of extending length of a steel bar by lap joint, has problems of slow binding speed and insufficient binding strength. In order to apply the steel bar in various specifications of buildings and effectively solve aforesaid problems, the constructor usually uses a steel-bar coupler to joint two steel bars for solving the problem of the steel bar having insufficient length. In order to facilitate to illustrate the application background of the present disclosure in the following paragraphs, the necessary process performed on the steel bar before joint is described below.

(1) First, an unprocessed steel bar has a bamboo-shaped structure or a structure with spiral sections, but not an ideal cylinder structure, so the manufacturer must extrude a part of the steel bar adjacent to an end head of the steel bar to be a round bar by a cold roll forming process.

(2) Next, a steel bar turning device is used to perform turning process on the part of the steel bar adjacent to the end head of the steel bar, to shape the part of the steel bar adjacent to the end head of the steel bar to be a round bar or a cone.

(3) Finally, a steel bar thread rolling device is used to perform thread rolling process on the round bar or cone to roll male threads on the round bar, so as to form a coupling head.

Therefore, when jointing the two steel bars, the manufacturer just needs to screw the male threads of the steel-bar coupling heads into female threads of a steel-bar coupler, thereby jointing the steel bars integrally. Because the steel-bar coupling head is an important key of affecting the joint strength and stability of the steel bar, how to improve the efficiency, quality and yield rate of steel-bar coupling head production is a core technology on which every manufacturer pays most attention. An objective of the present disclosure is to design a making machine to easily and quickly manufacture the high quality of steel-bar coupling head by automatic operation and management.

SUMMARY OF THE INVENTION

An exemplary embodiment of the present disclosure provides an automatic steel-bar coupling head making machine including a fixing base, a positioning mechanism, a guiding seat, a transverse moving mechanism, a longitudinal moving mechanism, a processing mechanism assembly and a control mechanism. The fixing base is fastened on a plane by a bottom side thereof. The positioning mechanism is fastened at a position on an upper surface of the fixing base and adjacent to a front side edge thereof, and includes two fixtures which each has a fastening groove recessed on a side surface thereof. The fastening grooves of the two fixtures correspond to each other and form a channel therebetween under a condition that the two fixtures are not pressed against with each other, thereby enabling a steel bar to be passed through the channel. Under a condition that the two fixtures are pressed against with each other, the fastening grooves are pressed against two opposite outer edges of the steel bar, so as to fixedly clamp the steel bar between the two fixtures. The guiding seat is fastened at a position on the upper surface of the fixing base and adjacent to a rear side edge of the fixing base, by a bottom side thereof. The transverse moving mechanism is movably positioned on the guiding seat by a bottom side thereof, and movable on the upper surface of guiding seat along a transverse direction. The longitudinal moving mechanism is movably positioned on the upper side of the transverse moving mechanism by a bottom side thereof, and movable on the upper surface of a transverse moving mechanism along a longitudinal direction. The processing mechanism assembly is fastened on an upper surface of the longitudinal moving mechanism, and includes a start mechanism, a first turning mechanism, a second turning mechanism and a thread-rolling mechanism. The start mechanism includes a positioning detection rod movably disposed at a front end thereof, and is configured to generate a start signal under a condition that the positioning detection rod is pressed by an end of the steel bar to longitudinally move a predetermined distance. The first turning mechanism is configured to perform first turning on a peripheral edge of the steel bar adjacent to an end of the steel bar. The second turning mechanism is configured to perform second turning on the peripheral edge of the steel bar adjacent to the end of the steel bar. A removal amount of the second turning is smaller than that of the first turning. The thread-rolling mechanism is configured to perform thread rolling on the peripheral edge of the steel bar adjacent to the end of the steel bar, to form a coupling head on the peripheral edge of the end of the steel bar. The control mechanism is electrically connected with the positioning mechanism, the transverse moving mechanism, the longitudinal moving mechanism and the processing mechanism assembly respectively, and configured to move the transverse moving mechanism, the longitudinal moving mechanism and the processing mechanism assembly to initial positions, thereby enabling the positioning detection rod to correspond to an in the channel along a longitudinal direction. Upon receipt of the start signal, the control mechanism drives the positioning mechanism, the transverse moving mechanism, the longitudinal moving mechanism and the processing mechanism assembly, to enable the two fixtures clamping the steel bar first and then perform the first turning, the second turning and the thread rolling on the peripheral edge of the steel bar adjacent to the end of the steel bar. Therefore, the automatic steel-bar coupling head making machine can complete the making operation for the steel bar coupling head precisely and quickly by a consistent process, so that the production efficiency can be greatly improved and the production cost can be effectively reduced.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 1:
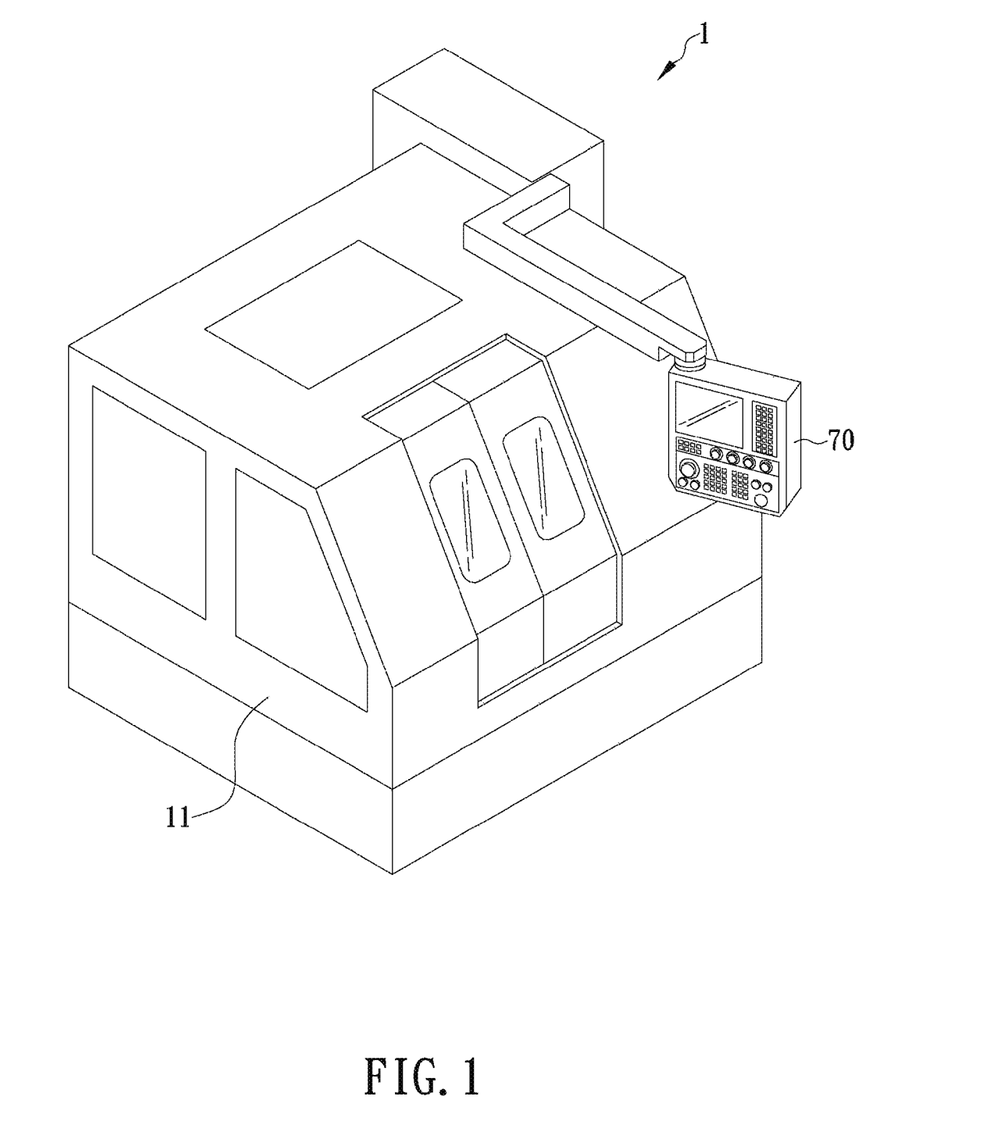
FIG. 1 is a schematic view of appearance of an automatic steel-bar coupling head making machine of the present disclosure.
Figure 2:
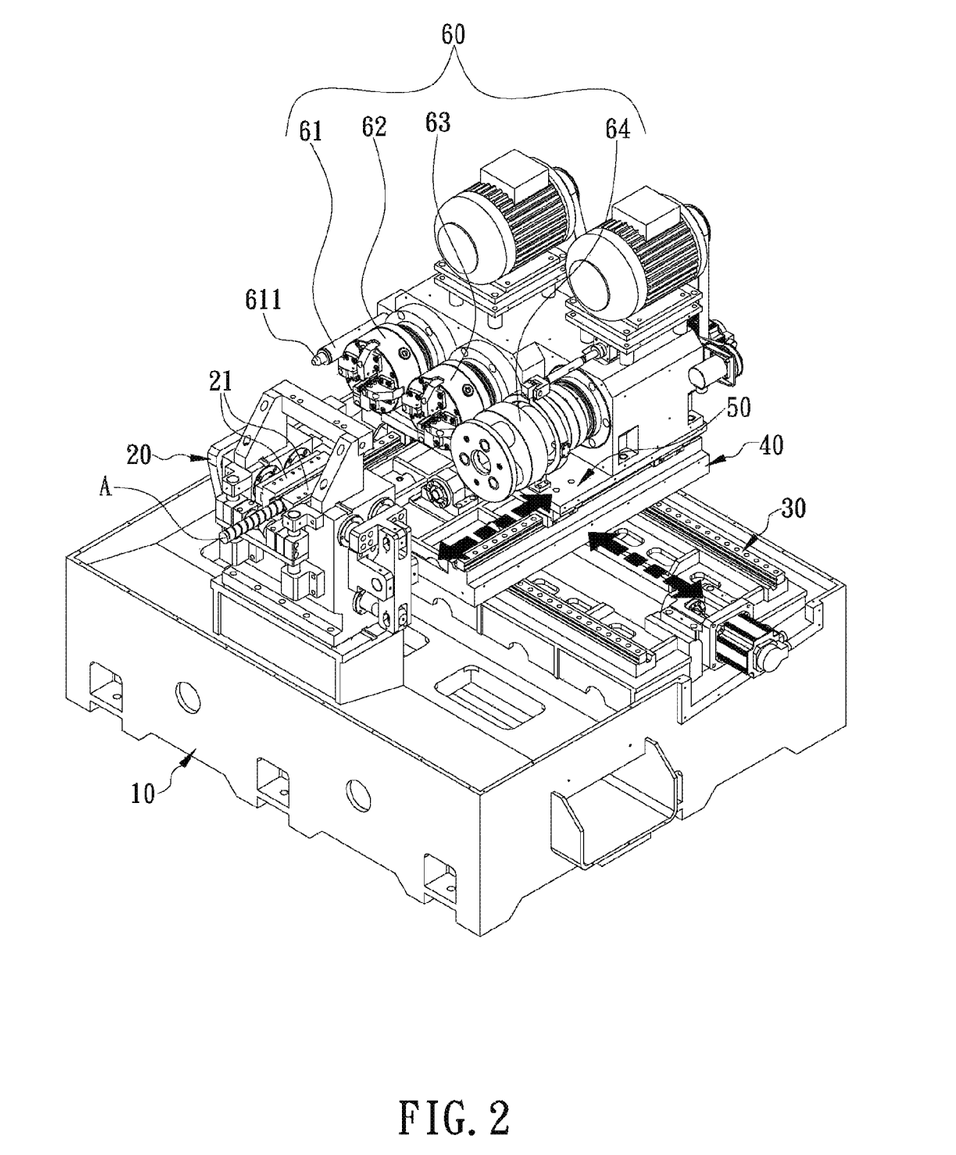
FIG. 2 is a schematic view of inner architecture of the automatic steel-bar coupling head making machine of the present disclosure.

Please refer to FIGS. 1 and 2. According to the present disclosure, an automatic steel-bar coupling head making machine includes a fixing base 10, a positioning mechanism 20, a guiding seat 30, a transverse moving mechanism 40, a longitudinal moving mechanism 50 and a processing mechanism assembly 60 which all are disposed inside a processing chamber 11, and a control mechanism 70 disposed the outside of the processing chamber 11. The control mechanism 70 is electrically connected with the positioning mechanism 20, the transverse moving mechanism 40, the longitudinal moving mechanism 50 and the processing mechanism assembly 60 respectively.

Figure 3:
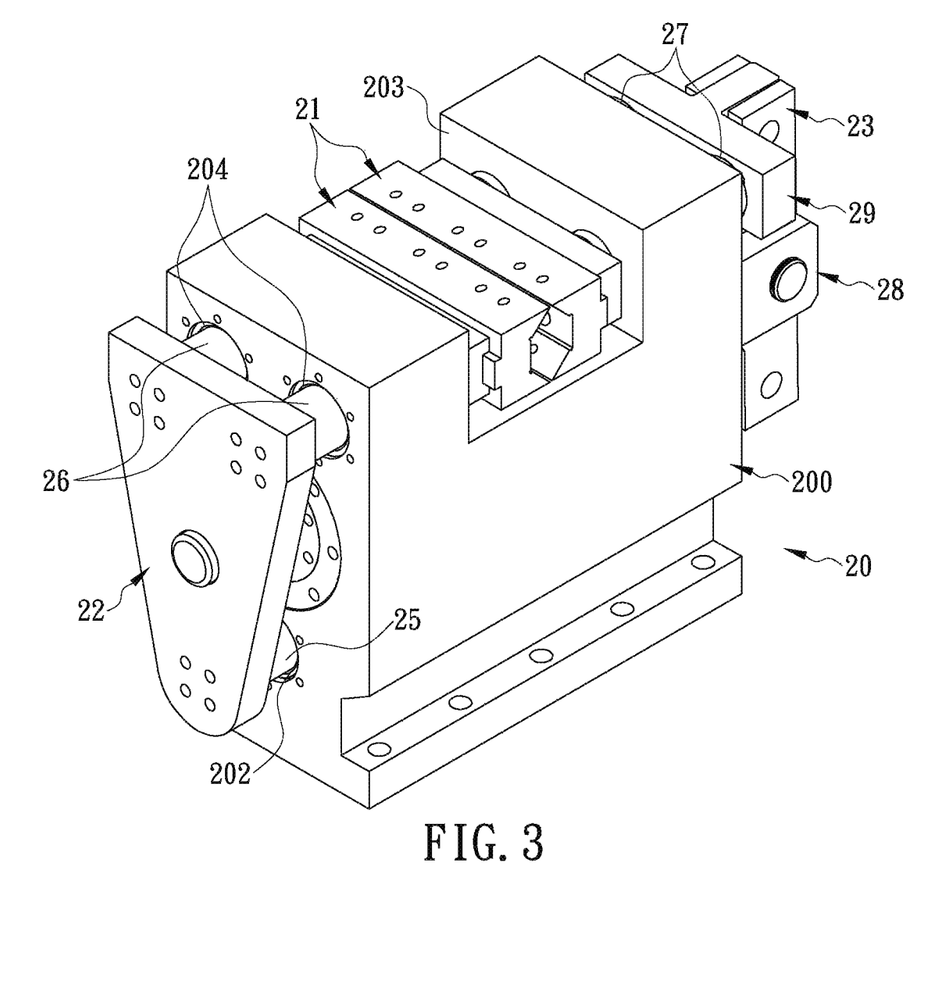
FIG. 3 is a schematic view of a positioning mechanism of the automatic steel-bar coupling head making machine of the present disclosure.
Figure 4:
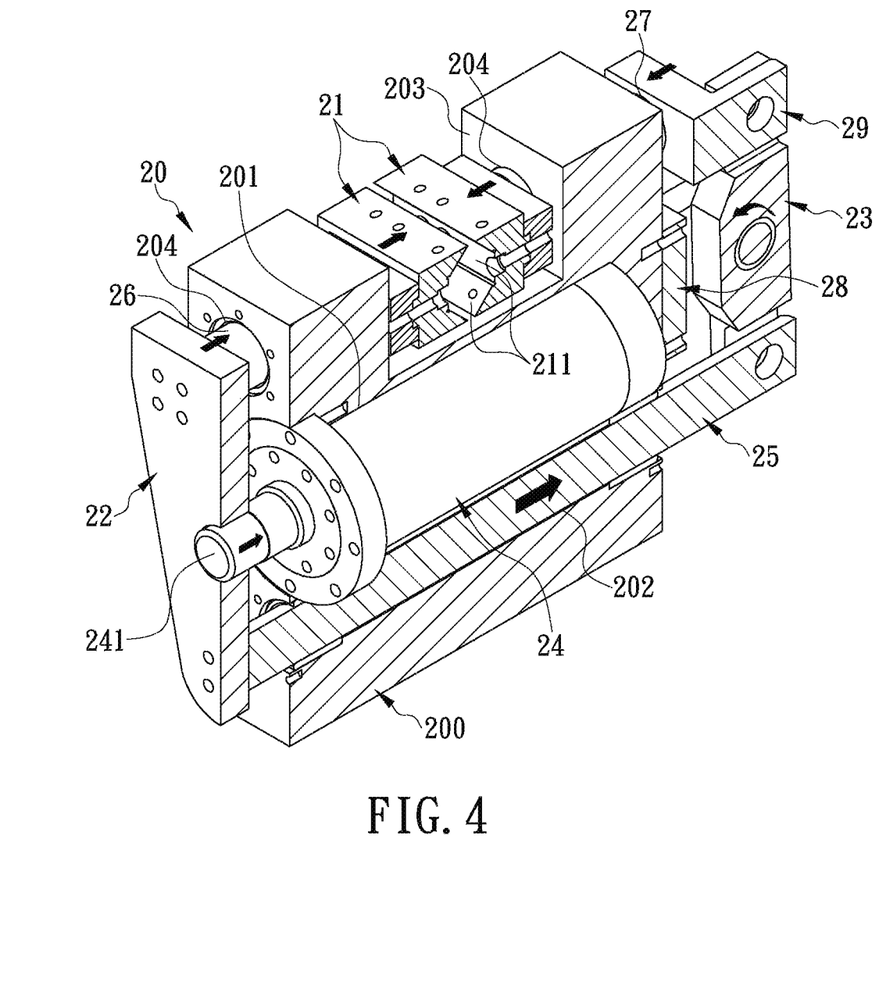
FIG. 4 is a cross section view of the positioning mechanism of the automatic steel-bar coupling head making machine of the present disclosure.

Please refer to FIGS. 2, 3 and 4. The fixing base 10 is fastened on a plane (such as the ground or a bottom plane of the processing chamber 11) by a bottom side thereof. The positioning mechanism 20 is fastened at a position on an upper surface of the fixing base 10 and adjacent to a front side edge thereof. For easy description, bottom left, top right, top left and bottom right corners of the FIG. 2 are defined as front, back, left and right directions for the making machine. The positioning mechanism 20 includes two fixtures 21 which each has a fastening groove 211 recessed on a side surface thereof. The fastening grooves 211 of the two fixtures 21 correspond to each other and form a channel therebetween under a condition that the two fixtures 21 are not pressed against with each other, so that a steel bar A can be passed through the channel. Under a condition that the two fixtures 21 are pressed against with each other, the fastening grooves 211 are pressed against the two opposite outer edges of the steel bar A, so as to fixedly clamp the steel bar A between the two fixtures 21. The bottom side of the guiding seat 30 is fastened at a position on the upper surface of the fixing base 10 and adjacent to a rear side edge of the fixing base 10.

Figure 7:
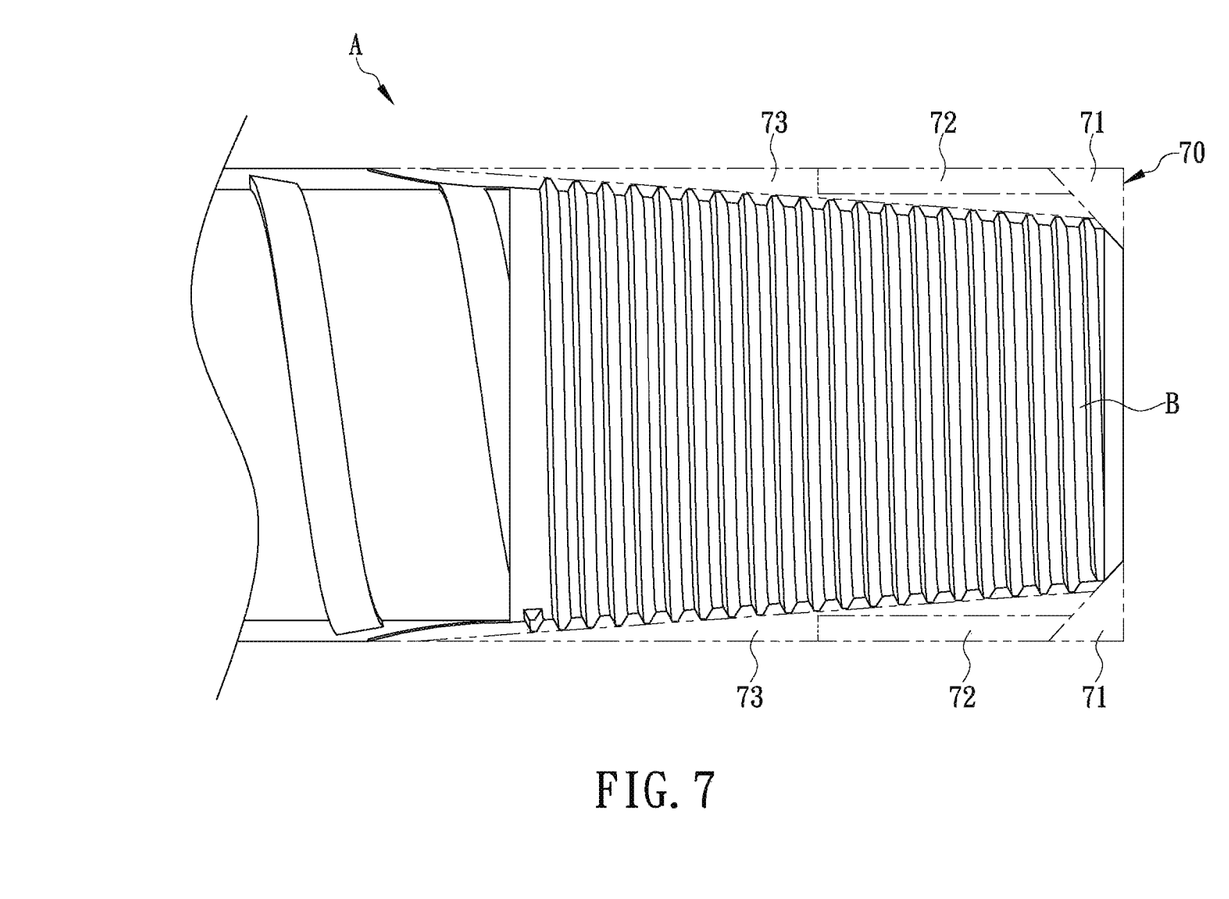
FIG. 7 is a schematic view of steel bar processed by the automatic steel-bar coupling head making machine of the present disclosure.

Please refer back to FIG. 2. The transverse moving mechanism 40 is movably positioned on the guiding seat 30 by a bottom side thereof, and movable along a plurality of tracks disposed on the guiding seat 30 in left and right directions. The longitudinal moving mechanism 50 is movably positioned on the transverse moving mechanism 40 by a bottom side thereof, and movable along a plurality of tracks disposed on the upper surface of a transverse moving mechanism 40 in a longitudinal direction. The processing mechanism assembly 60 is fastened on an upper surface of longitudinal moving mechanism 64 by a bottom side thereof, and includes a start mechanism 61, a first turning mechanism 62, a second turning mechanism 63 and a thread-rolling mechanism 64. The mechanisms 61 through 64 are arranged in sequential order from the left and right sides of the making machine. The start mechanism 61 includes a positioning detection rod 611 movably disposed at a front end thereof. When the positioning detection rod 611 is pressed by an end of the steel bar A to longitudinally move by a predetermined distance, the start mechanism 61 determines that the steel bar A is positioned at a predetermined position and ready for further processing, so the start mechanism 61 generates a start signal. Each of the first and second turning mechanisms 62 and 63 includes a plurality of turning tools to sequentially perform first and second turnings on a peripheral edge (hereafter refer to "a coupling end") of the steel bar A adjacent to an end of the steel bar A. The first turning is coarse processing and the second turning is fine processing, that is, a removal amount of the second turning is smaller than that of the first turning. The thread-rolling mechanism 64 can perform thread rolling on the coupling end which has been performed by two times of turning process, so as to form a coupling head B on the peripheral edge of the end of the steel bar A, as shown in FIG. 7.

Please refer back to FIG. 2. For easy illustration of whole process flow, the way that the manufacturer operates the control mechanism 70 to start the processing mechanism assembly 60 to perform process is described below.

(1) After the steel bar A is placed into the channel between the fastening grooves 211, and the control mechanism 70 is operated to drive the transverse moving mechanism 40 and the longitudinal moving mechanism 50, to move the start mechanism 61 to an initial position, so that the positioning detection rod 611 can correspond in position to the channel in longitudinal direction.

(2) Next, when the start mechanism 61 transmits the start signal to the control mechanism 70, the control mechanism 70 drives the positioning mechanism 20 to enable the two fixtures 211 to clamp the steel bar A.

(3) Finally, the control mechanism 70 sequentially drives the transverse moving mechanism 40, the longitudinal moving mechanism 50 and the processing mechanism assembly 60 in sequential order, to enable the first turning mechanism 62, the second turning mechanism 63 and the thread-rolling mechanism 64 to sequentially perform the first turning, the second turning and the thread rolling on the coupling end of the steel bar A, respectively.

During processing, the first turning mechanism 62 performs the rough process on the coupling end to form a chamfer part and a rough contour (such as a conical body or a cylinder body) of the coupling head. Next, the second turning mechanism 63 performs the fine process to form a precise outer contour of the coupling end. Finally, the thread-rolling mechanism 64 is operated to form threads on the coupling end. Therefore, the making operation for the coupling head of the steel bar can be precisely and quickly completed by a consistent process.

Please refer back to FIGS. 3 and 4. The positioning mechanism 20 includes a positioning seat 200, two fixtures 21, a moving plate 22, and at least one linking plate 23. The positioning seat 200 defines a cavity 201 in which a hydraulic jack 24 is fastened. The hydraulic jack 24 has a pushing rod 241 which has an end disposed inside the hydraulic jack 24 and other end protruded out of the hydraulic jack 24 and extended to expose out of the left side of the positioning seat. The hydraulic jack 24 can apply a push force or a pull force on the end of the pushing rod 241, to move the other end of the pushing rod 241 leftwardly or rightwardly. The positioning seat 200 further has a through hole 202 located near the bottom side thereof and cut therethrough along a transverse direction thereof, and a link rod 25 is movably inserted into the through hole 202 and has two ends respectively exposed out of left and right sides of the positioning seat 200. The positioning seat 200 has a groove 203 recessed on a top side thereof, and at least two guide holes 204 located near the top side and cut therethrough along the transverse direction. Each two guide holes 204 corresponding to each other are located on the same centerline, and the corresponding ends of the two guide holes 204 are respectively in communication with the groove 203. First and second locating rods 26 and 27 are movably inserted into the two guide holes 204 respectively, and respectively have ends exposed in the groove 203 and other ends exposed out of the left and right sides of the positioning seat 200, and disposed in parallel with the pushing rod 241 and the link rod 25 respectively. Each of the two fixtures 21 has the fastening groove 211 recessed on the side thereof, and the two fixtures 21 respectively have other sides which are opposite to the fastening grooves 211 and fastened with the ends of the two first and second positioning rods 26 and 27. From up to down, the moving plate 22 is fastened with the other end of the first positioning rod 26, the other end of the pushing rod 241 and the link rod 25, so that the moving plate 22 can simultaneously move the first positioning rod 26 and the link rod 25 leftwardly (or rightwardly) when the pushing rod 241 is moved leftwardly (or rightwardly). From up to down, the linking plate 23 is respectively pivotally connected with the other end of the second positioning rod 27, the positioning seat 200 and the link rod 25, so that the linking plate 23 can simultaneously move the second positioning rod 27 leftwardly (or rightwardly) when the first positioning rod 26 and the link rod 25 are moved rightwardly (or leftwardly), thereby enabling the two fixtures 21 located on the ends of the first and second positioning rods 26 and 27 to clamp (or release) the steel bar.

Therefore, just one hydraulic jack 24 is required to be disposed in the positioning mechanism 20, and inside the positioning seat 200 rather than outside the positioning seat 200, so the positioning mechanism 20 does not occupy excessive space for placement and the hydraulic jack 24 does not occupy the space outside of the positioning mechanism 20. The link structures formed between the pushing rod 241, the moving plate 22, the linking plate 23, the link rod 25 and the first and second positioning rods 26 and 27 are completely mechanical structures, so the first and second positioning rods 26 and 27 can be simultaneously moved in reverse directions to enable simultaneous reverse displacements of the two fixtures 21 disposed thereon, thereby precisely and stably clamping and locating the steel bar A in a predetermined center position. In addition, the mechanical link structures have features of low breakdown rate and easy repair and maintenance, so the complexity of repair and maintenance can be effectively reduced and precision and endurability of the positioning mechanism 20 can be greatly improved.

Please refer back to FIGS. 3 and 4. The positioning seat 200 has four guide holes 204 located near the top side thereof and cut therethrough along the transverse direction thereof. Each two guide holes 204 corresponding to each other in the transverse direction are located on the same centerline, and their corresponding ends are in communication with the groove 203. The first and second positioning rods 26 and 27 are movably inserted into the two corresponding guide holes 204. Each two guide holes 204 longitudinally adjacent to each other are arranged in parallel and the first positioning rods 26 or the second positioning rods 27 movably inserted therein are also in parallel with each other. Therefore, the fixtures 21 disposed on ends of the first and second positioning rods 26 and 27 can effectively clamp and position the steel bar with higher stability and precision. The positioning mechanism 20 further includes a pivot member 28 and at least one adaptor member 29. A side of the pivot member 28 is fastened at a position on an outer edge of a right side of the positioning seat 200 and adjacent to a middle portion of the positioning seat 200, so that the linking plate 23 can be pivotally connected with other side of the pivot member 28 by a part adjacent to the middle portion thereof. The adaptor member 29 is fastened with the other end of the second positioning rod 27 by a side thereof, so that the linking plate 23 can be pivotally connected with other side of the adaptor member 29 by a part thereof adjacent to the top side thereof. Therefore, the structural design of the positioning seat 200 can be more flexible.

Figure 5A:
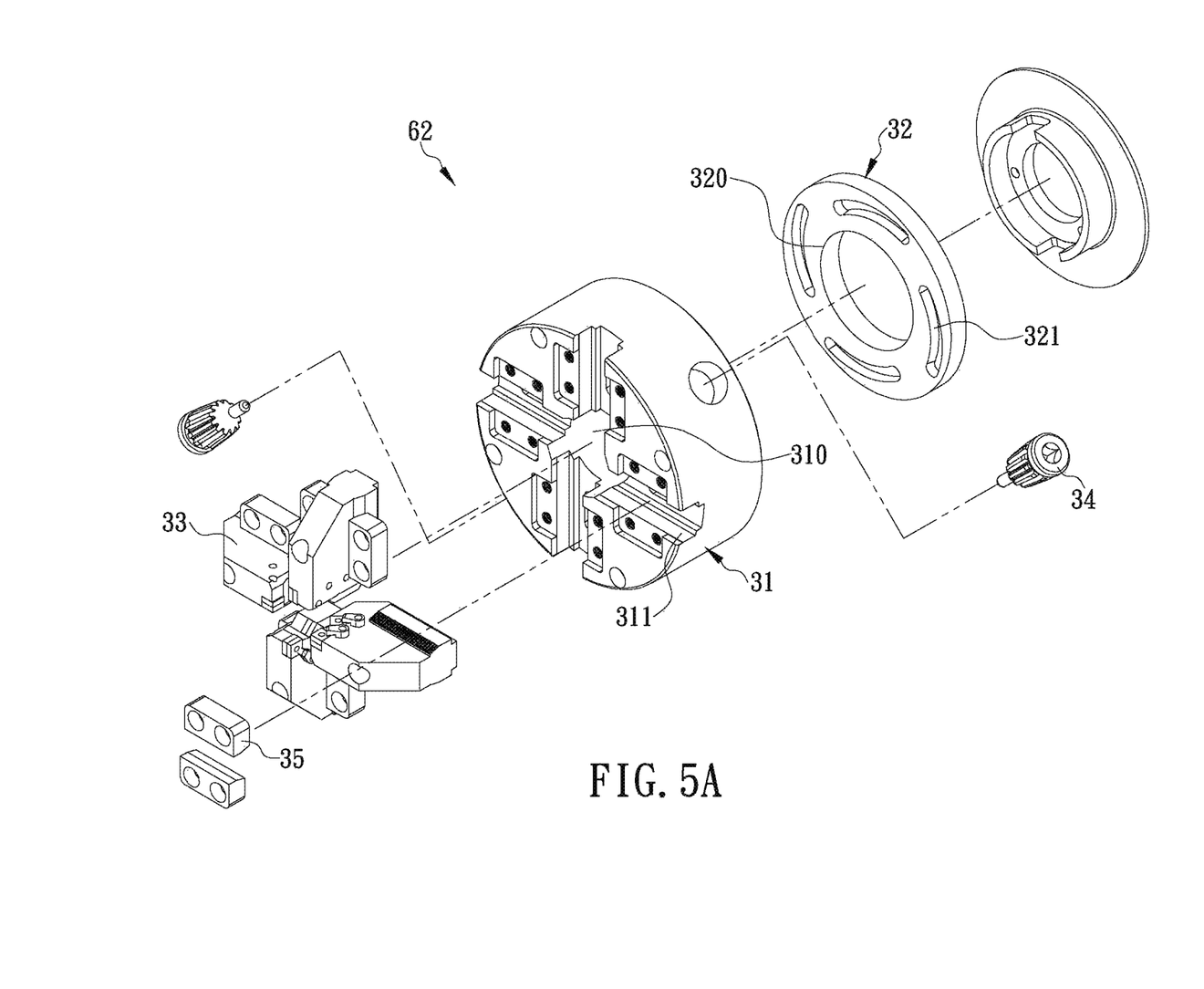
FIG. 5A is a schematic view of a first turning mechanism of the automatic steel-bar coupling head making machine of the present disclosure.

Please refer to FIGS. 2, 5A through 5C, and 6A. The first turning mechanism 62 includes a main seat body 31, a driving rotating disc 32 and a plurality of turning turrets 33. The second turning mechanism 63 also has the main seat body 31 and the driving rotating disc 32 the same as that of the first turning mechanism 62, and further has a turning turret with design and configuration different from that of the first turning mechanism 62. The main seat body 31 has an accommodating hole 310 axially cut therethrough, and a plurality of track grooves 311 radially disposed on a front side thereof (the bottom left and top right sides of the FIG. 5A are defined as the front and back directions respectively), each track groove 311 has an end located on the main seat body 31 and adjacent to a peripheral edge of the main seat body 31, and other end straightly communicated with the accommodating hole 310. The accommodating hole 310 is configured to accommodate the steel bar A. The main seat body 31 has an assembly groove 312 which is disposed on a rear surface thereof, ring-shaped and configured to be in communication with the accommodating hole 310 and a rear end of the track groove 311. The driving rotating disc 32 has a structure matching with the assembly groove 312 and is positioned and rotatable in the assembly groove 312. The driving rotating disc 32 has a through hole 320 located on a front surface thereof and corresponding in position to the accommodating hole 310, and a plurality of guide grooves 321 recessed on the front surface thereof and adjacent to the through hole 320. Each of the plurality of guide grooves 321 is arc-shaped and has an end adjacent to the peripheral edge of the driving rotating disc 32 and other end adjacent to central portion of the driving rotating disc 32. Please refer back to FIGS. 2, and 5A through 5B. Each turning turret 33 has a track part 331 disposed at a rear end thereof and having a structure matching with the track groove 311, and an engagement part 332 protruded backwardly. When the track part 331 are engaged into the track grooves 311 corresponding thereto, the engagement parts 332 are passed through the track groove 311 to be movably engage into the guide grooves 321. The track part 331 has a turning tool installation portion 333 disposed at a front end and extended along an axial direction of the main seat body 31, and the turning tool installation portion is configured to install at least one turning tool for performing turning on the steel bar A.

Figure 5B:
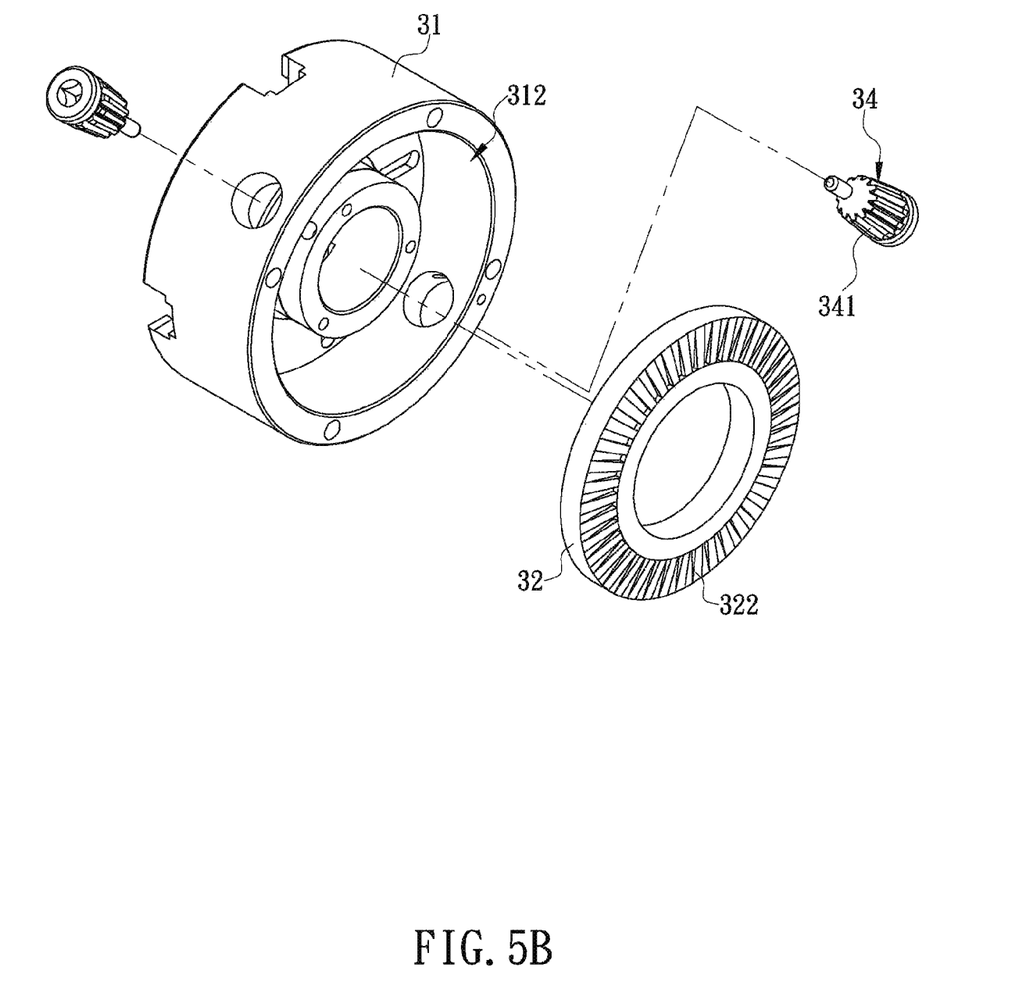
FIG. 5B is other schematic view of the first turning mechanism of the automatic steel-bar coupling head making machine of the present disclosure.
Figure 5C:
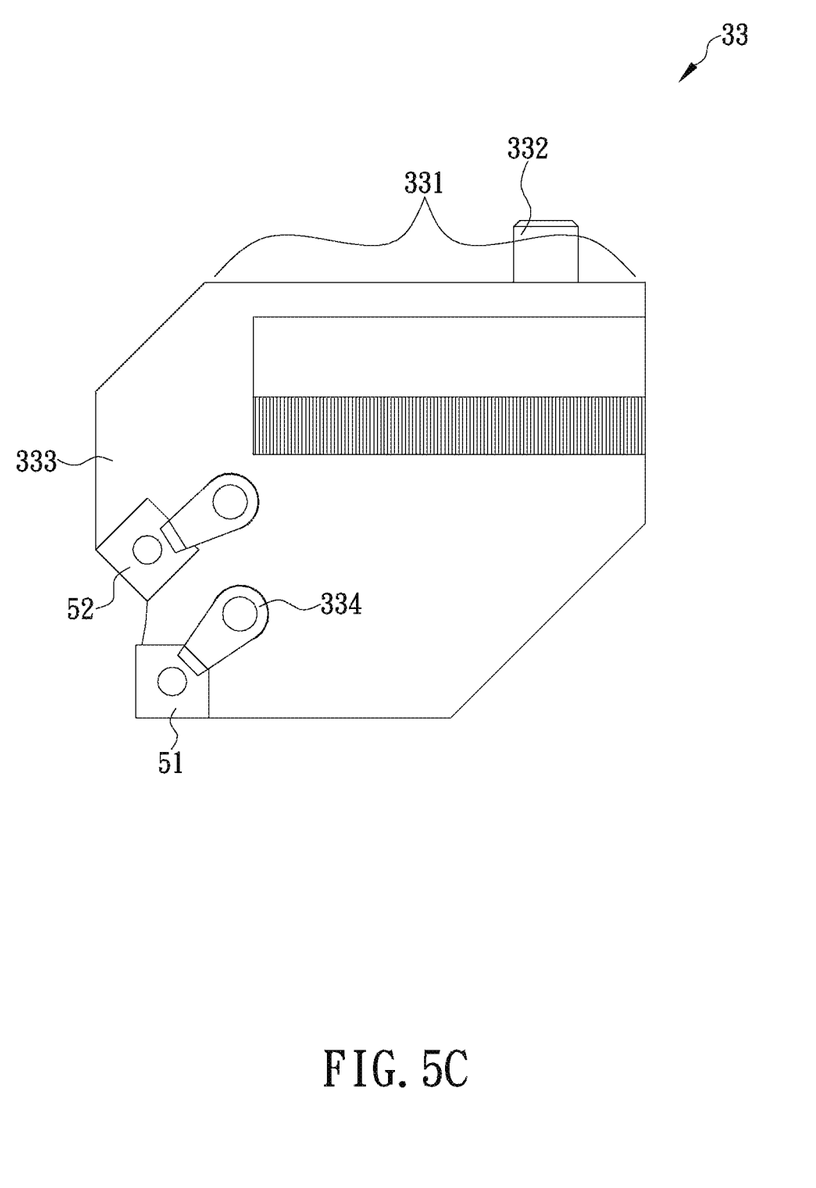
FIG. 5C is a schematic view of a turning turret of the first turning mechanism of the automatic steel-bar coupling head making machine of the present disclosure.

In present embodiment, the driving rotating disc 32 has a plurality of first tooth parts 322 radially disposed on a rear surface thereof, and the main seat body 31 has at least one adjustment member 34 pivotally connected with the peripheral edge thereof. The adjustment member 34 has an end exposed out of the peripheral edge of the main seat body 31 and other end inserted into the assembly groove 312, and has a plurality of second tooth parts 341, similar with a bevel gear. The plurality of second tooth parts 341 correspond in position to the first tooth parts 322 to be engaged with each other. When the steel bar A is inserted into the accommodating hole 310, the manufacturer just needs to rotate the adjustment member 34 to drive the driving rotating disc 32 to simultaneously move the turning turrets 33, so that the turning turrets 33 can correspond to peripheral edges of the steel bar A with different size, along the plurality of track grooves 31. In present embodiment, each of the turning turrets 33 can has a tooth bar disposed on a side surface thereof, so that the manufacturer can use a pressing block 35 which has corresponding tooth bar disposed thereon, to fasten the plurality of turning turrets 33.

Please refer back to FIGS. 2, and 5A through 5C. The first turning mechanism 62 includes four turning turrets 33 arranged in the same intervals and driven by the driving rotating disc 32 simultaneously. On the turning tool installation portion 333, a first turning tool 51 is disposed adjacent to the front end of the turning tool installation portion 333, and a second turning tool 52 is disposed adjacent to the rear end of the turning tool installation portion 333. The amount of the first turning tool 51 can be adjusted upon requirement of specification of the steel bar A. The turning tool installation portion 333 has a bent part located correspondingly in position to the second turning tool 52, so that the second turning tool 52 is closer to the accommodating hole 310 than the first turning tool 51. Under a condition that the driving rotating disc 32 is being driven to rotate, the plurality of turning turrets 33 are linked with the driving rotating disc 32 through the engagement part 332, consequently the plurality of turning turrets 33 are driven by the driving rotating disc 32 simultaneously to move towards the accommodating hole 310 along the directions of the plurality of track grooves 311, so that distances between the plurality of turning turrets 33 can be matched with the structure of the steel bar.

Please refer to FIGS. 2, and 6A through 6C. The second turning mechanism 63 includes four turning turrets 43, and each turning turret 43 also includes a track part 43, an engagement part 432 and a turning tool installation portion 433. The plurality of turning turrets 433 are divided into multiple pairs, and arranged along vertical and horizontal directions respectively. The turning tools of the turning turrets 43 arranged in different directions are staggered in position from each other. In present embodiment, each of the plurality of turning turrets 43 has three third turning tools 53 or four fourth turning tools 54. For example, each of the turning turrets 43 arranged in the vertical direction has three third turning tools 53, and each of the turning turrets 43 arranged in the horizontal direction has four fourth turning tools 54. The third turning tools 53 and the fourth turning tools 54 are staggered in position from each other, so as to uniformly perform "the fine process" on the steel bar A.

Please refer to FIGS. 2, 5A through 7. FIG. 7 is taken as an example for illustration of the difference between the rough process and the fine process, and the difference is illustrated below. After a part of the steel bar A near the end thereof is extruded to be a round bar 70 by a cold roll forming process (in FIG. 7, the steel bar A is shown as a structure processed by two times of turning and two times of thread rolling, and the round bar 70 is shown as a schematic contour before turning), the first turning mechanism 62 cuts out a chamfer part 71 and a first redundant part 72 of the round bar 70 by using the first turning tool 51 and the second turning tool 52 respectively. Next, the second turning mechanism 63 is operated to cut out the second redundant part 73 of the round bar 70 by using the plurality of third turning tools 53 and the fourth turning tools 54. The total volume of the chamfer part 71 and the first redundant part 72 is larger than that of the second redundant part 73.

Figure 6A:
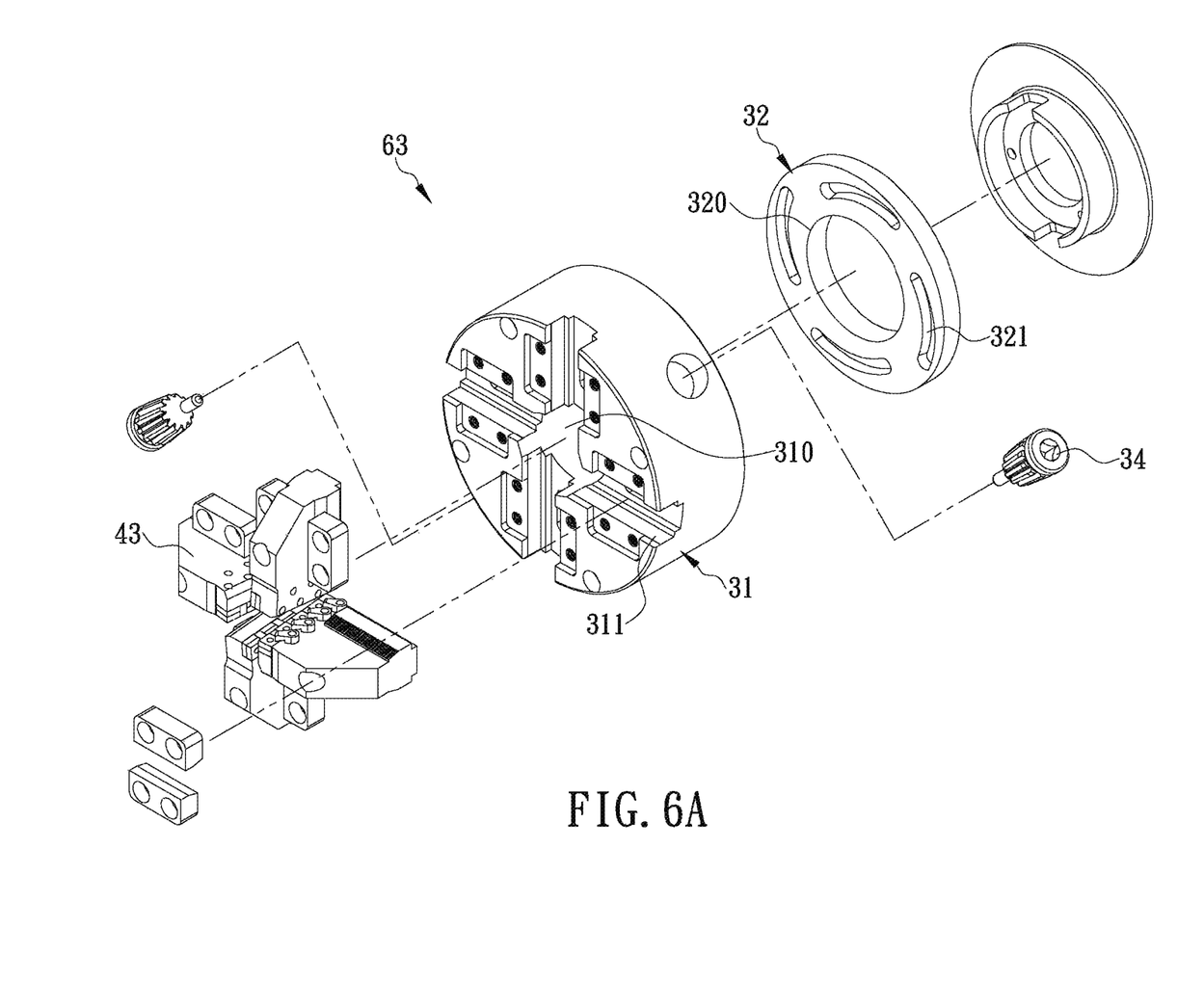
FIG. 6A is a schematic view of a second turning mechanism of the automatic steel-bar coupling head making machine of the present disclosure.
Figure 6B:
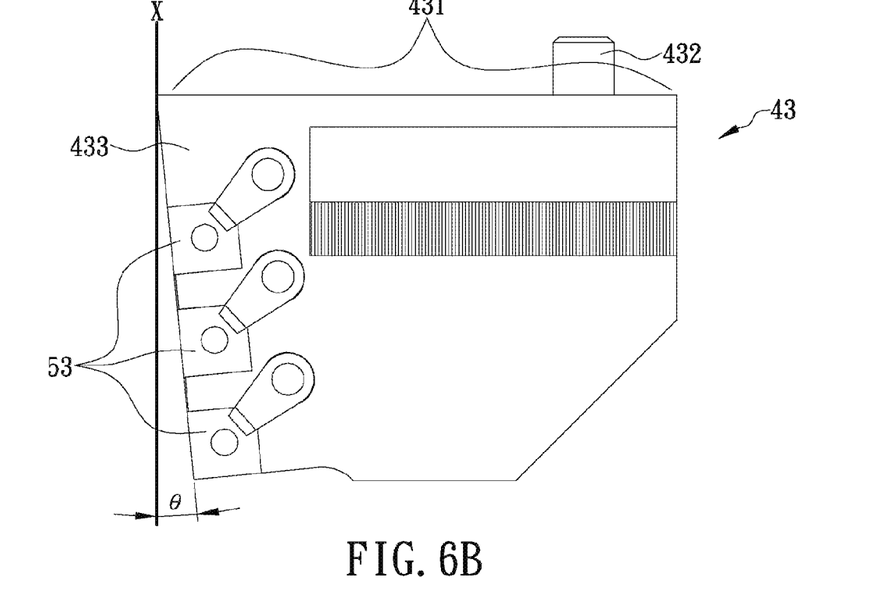
FIG. 6B is a schematic view of a turning turret of the second turning mechanism of the automatic steel-bar coupling head making machine of the present disclosure.
Figure 6C:
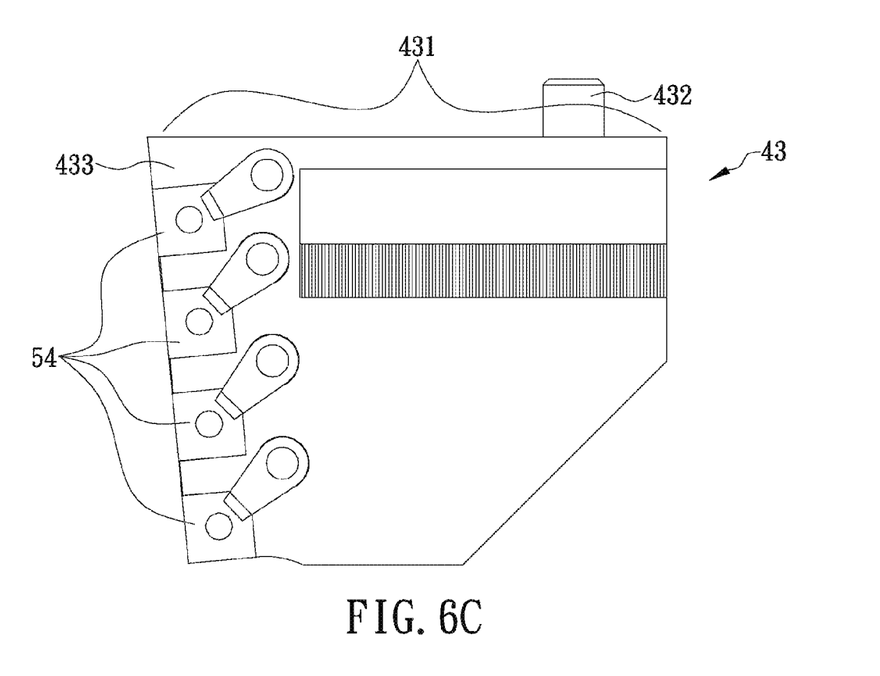
FIG. 6C is a schematic view of other turning turret of the second turning mechanism of the automatic steel-bar coupling head making machine of the present disclosure.

In present embodiment, the first turning mechanism 62 and the second turning mechanism 63 can perform the turning on the steel bar A by using the four turning turrets 33 at the same time, so each turning tool bears lower load and the turning process can also be performed more precisely. In addition, the turning turret 43 shown in FIGS. 6A through 6C is designed as a cone type, that is, there is an inclined angle θ between the side surface of the turning turret 43 facing the accommodating hole 310 and an X axis of the main seat body 31, and the side surface of the turning turret 43 is an inclination surface, so that the second turning mechanism 63 can perform the turning on the steel bar A to be a conical shape. Similarly, the turning turret 43 can also be designed as a straight type, that is, the side surface of the turning tool installation portion 433 facing the accommodating hole 310 is a straight surface which is parallel with the X axis of the main seat body 31 (the inclined angle θ is zero), so that the second turning mechanism 63 can perform the turning on the steel bar A to be a cylinder shape. Please refer back to FIGS. 5A through 5C. The turning tool installation portion 333 of each of the plurality of turning turrets 33 further has at least two pressing plates 334 which each has an end fastened on the turning tool installation portion 333 and other end having a bent part, and an end edge of the bent part is configured to tightly press a part of the turning tool near to a middle section of the turning tool, so as to greatly improve the installation stability of the first turning tool 51 and effectively prevent the first turning tool 51 from being loosened, and it greatly increases the turning precision.

Figure 8:
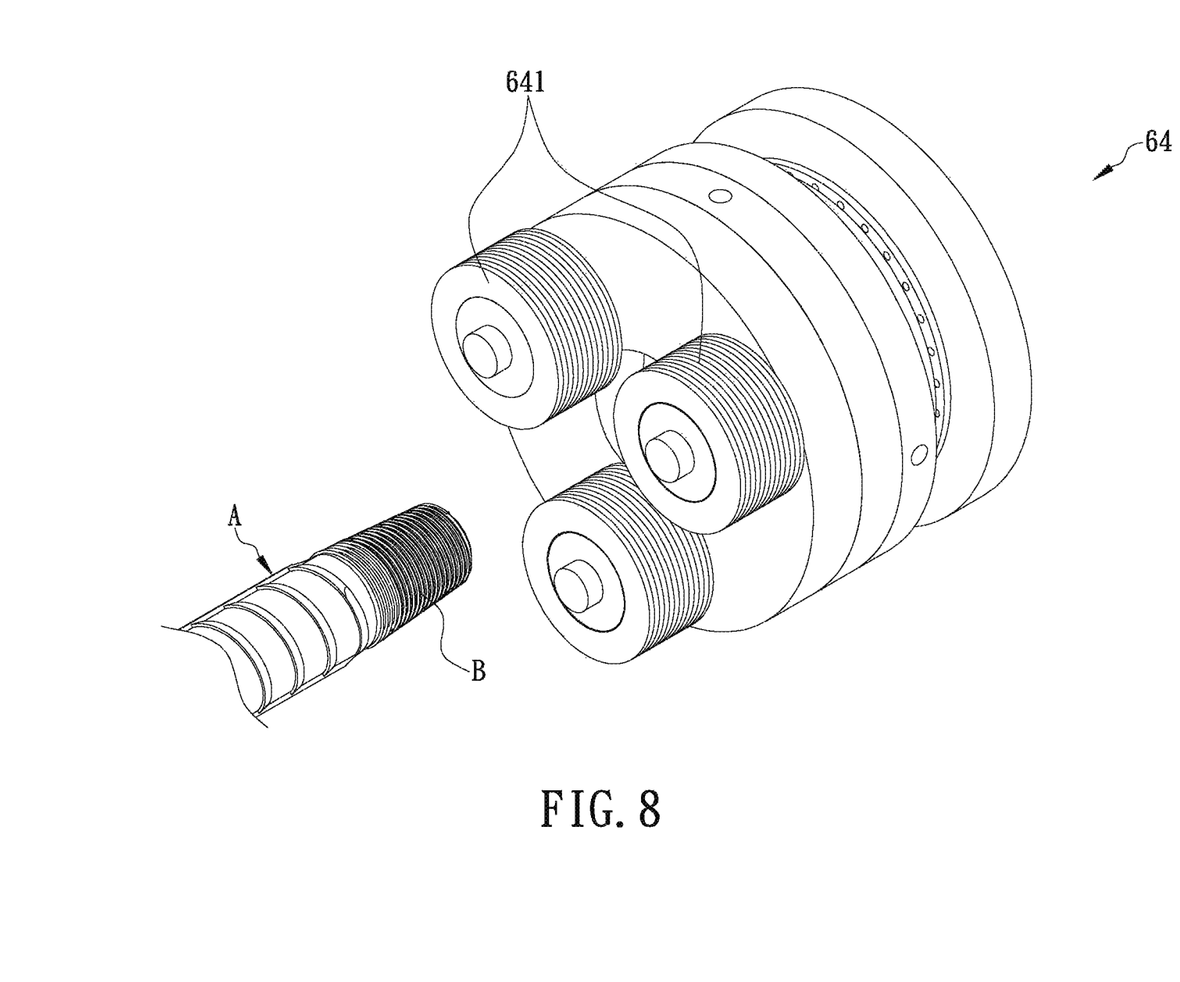
FIG. 8 is a schematic view of a thread-rolling mechanism of the automatic steel-bar coupling head making machine of the present disclosure.

Please refer to FIGS. 2 and 8. In present embodiment, the thread-rolling mechanism 64 includes at least three thread rolling heads 641, and can be driven by the transverse moving mechanism 40 and longitudinal moving mechanism 50 to move. When the steel bar A is inserted between the plurality of thread rolling heads 641, a driving motor (not shown in figures) can drive the plurality of thread rolling heads 641 to rotate to perform thread rolling on the end of the steel bar A which has been performed by two times of the turning process, so as to form a steel-bar coupling head B.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An automatic steel-bar coupling head making machine, comprising:
  a fixing base having a bottom side fastened on a plane;
  a positioning mechanism fastened at a position on an upper surface of the fixing base and adjacent to a first side edge of the fixing base and comprising two fixtures, wherein each of the two fixtures has a fastening groove recessed on a side surface thereof, the fastening grooves of the two fixtures correspond to each other and form a channel therebetween, under a condition that the two fixtures are not pressed against with each other, so as to enable a steel bar to be passed through the channel, and wherein, under a condition that the two fixtures are pressed against with each other, the fastening grooves are pressed against two opposite outer edges of the steel bar, so as to fixedly clamp the steel bar between the two fixtures;
  a guiding seat having a bottom side fastened at a position on the upper surface of the fixing base and adjacent to a second side edge of the fixing base, wherein the second side edge of the fixing base is disposed opposite the first side edge of the fixing base;
  a transverse moving mechanism having a bottom side movably positioned on the guiding seat, wherein the transverse moving mechanism is movable on an upper surface of the guiding seat along a transverse direction;
  a longitudinal moving mechanism having a bottom side movably positioned on an upper side of the transverse moving mechanism, wherein the longitudinal moving mechanism is movable on the upper surface of the transverse moving mechanism along a longitudinal direction;
  a processing mechanism assembly fastened on an upper surface of the longitudinal moving mechanism, and comprising:
    a start mechanism comprising a positioning detection rod movably disposed at a first end thereof, and configured to generate a start signal under a condition that the positioning detection rod is pressed by an end of the steel bar to longitudinally move a predetermined distance;
    a first turning mechanism configured to perform first turning on a peripheral edge of the steel bar adjacent to the end of the steel bar;
    a second turning mechanism configured to perform second turning on the peripheral edge of the steel bar adjacent to the end of the steel bar, and a removal amount of the second turning smaller than that of the first turning; and
    a thread-rolling mechanism configured to perform thread rolling on the peripheral edge of the steel bar adjacent to the end of the steel bar, to form a coupling head on the peripheral edge of the end of the steel bar; and
  a control mechanism electrically connected with the positioning mechanism, the transverse moving mechanism, the longitudinal moving mechanism, and the processing mechanism assembly respectively, and configured to move the transverse moving mechanism, the longitudinal moving mechanism, and the processing mechanism assembly to initial positions respectively, so as to enable the positioning detection rod to correspond to the channel along a longitudinal direction, wherein, upon receipt of the start signal, the control mechanism:
    drives the positioning mechanism, the transverse moving mechanism, the longitudinal moving mechanism, and the processing mechanism assembly;
    enables the two fixtures to clamp the steel bar; and
    provides for sequential performing of the first turning, the second turning, and the thread rolling on the peripheral edge of the steel bar adjacent to the end of the steel bar.

2. The automatic steel-bar coupling head making machine according to claim 1, wherein the positioning mechanism comprises:
  a positioning seat defining a cavity transversely formed adjacent to a middle portion thereof, and wherein a hydraulic jack is fastened inside the cavity and comprises a pushing rod which has a first end disposed inside the hydraulic jack and a second end that protrudes out of the hydraulic jack and is extended to so as to be exposed out of a side of the positioning seat, and the hydraulic jack is configured to apply a push force or a pull force on the first end of the pushing rod to move the second end of the pushing rod, and wherein the positioning seat further comprises a through hole located near the bottom side thereof and transversely cut therethrough, and a link rod is movably inserted into the through hole and has two ends respectively exposed out of two opposite sides of the positioning seat, and wherein the positioning seat has a groove recessed on a top side thereof, and at least two guide holes located near the top side and transversely cut therethrough, and the at least two guide holes are located on a same centerline, and the corresponding ends of the at least two guide holes are respectively in communication with the groove, and a first positioning rod and a second positioning rod are movably inserted into the at least two guide holes respectively, and respectively have first ends exposed in the groove and second ends exposed out of the two opposite sides of the positioning seat, and disposed in parallel with the pushing rod and the link rod respectively, and wherein the two fixtures respectively have second sides opposite to the fastening grooves and fastened with the first ends of the first positioning rod and the second positioning rod, respectively;

a moving plate, from up to down, fastened with the second end of the first positioning rod, the second end of the pushing rod, and the link rod, and configured to simultaneously move the first positioning rod and the link rod while the pushing rod is moved; and a linking plate, from up to down, pivotally connected with the second end of the second positioning rod, the positioning seat and the link rod respectively, and configured to simultaneously move the second positioning rod reversely when the first positioning rod and the link rod are moved, thereby enabling the two fixtures located on the first ends of the first positioning rod and second positioning rod to clamp or release the steel bar.

3. The automatic steel-bar coupling head making machine according to claim 2, wherein the at least two guide holes comprise four guide holes located near the top side of the positioning seat and transversely cut therethrough, and the four guide holes form two corresponding pairs of two guide holes that are located on the same centerline and have corresponding ends respectively in communication with the groove; wherein the two corresponding pairs of two guide holes are longitudinally adjacent to one another, and the first locating rod and second locating rod are each movably inserted into one of the two corresponding pairs of two guide holes such that the first locating rod and the second locating rod are parallel with each other.

4. The automatic steel-bar coupling head making machine according to claim 3, further comprising:

a pivot member having a first side fastened at a position on an outer edge of the positioning seat and adjacent to a middle portion of the positioning seat, and a second side pivotally connected with the linking plate and adjacent to a middle portion of the linking plate.

5. The automatic steel-bar coupling head making machine according to claim 4, further comprising:

at least one adaptor member having a first side fastened with the second end of the second positioning rod, and a second side pivotally connected with the linking plate and adjacent to a top side of the linking plate.

6. The automatic steel-bar coupling head making machine according to claim 5, wherein each of the first turning mechanism and the second turning mechanism comprises:

a main seat body having an accommodating hole axially cut therethrough, and a plurality of track grooves radially disposed on a first side thereof with respect to the axially cut accommodating hole, and each of the plurality of track grooves having a first end located on the main seat body and adjacent to a peripheral edge of the main seat body and a second end straightly communicated with the accommodating hole, and the main seat body having an assembly groove disposed on a second side thereof and in communication with the accommodating hole and the plurality of track grooves;

a driving rotating disc having a structure matching with the assembly groove, and positioned and rotatable in the assembly groove, and having a plurality of guide grooves disposed on a first side thereof and cut therethrough, and wherein each of the plurality of guide grooves is arc-shaped, and has a first end adjacent to the peripheral edge of the driving rotating disc and a second end adjacent to a central portion of the driving rotating disc; and a plurality of turning turrets, wherein each of the plurality of turning turrets has a track part disposed at a first end thereof and having a structure matching with each of the plurality of track grooves, and has an engagement part protruded thereon and configured to pass through one of the plurality of track grooves to be movably engaged into the guide groove under a condition that the track parts are engaged into the track grooves corresponding thereto; wherein the track part has a turning tool installation portion disposed at a first end thereof and extended along an axial direction of the main seat body, and the turning tool installation portion is configured to install a plurality of turning tools, wherein under the driving rotating disc is driven to rotate, the plurality of turning turrets are connected with the driving rotating disc through the engagement parts thereof, so that the plurality of turning turrets are driven by the driving rotating disc simultaneously to move towards the accommodating hole along the direction of the plurality of track grooves, thereby enabling distances between the plurality of turning turrets to be matched with a structure of the steel bar.

7. The automatic steel-bar coupling head making machine according to claim 6, further comprising a first turning tool disposed adjacent to a first end of the turning tool installation portion, and a second turning tool disposed adjacent to a second end of the turning tool installation portion, wherein the second turning tool is closer to the accommodating hole than the first turning tool.

8. The automatic steel-bar coupling head making machine according to claim 7, wherein the second turning mechanism has four turning turrets which are divided into multiple pairs and arranged along vertical and horizontal directions respectively, and the turning tools of the four turning turrets arranged in different directions are staggered in position from each other.

9. The automatic steel-bar coupling head making machine according to claim 8, wherein the turning tool installation portion of each of the plurality of turning turrets further has at least two pressing plates, each of the at least two pressing plates has a first end fastened on the turning tool installation portion and a second end having a bent part, and an end edge of the bent part is configured to tightly press a part of the associated turning tool near to a middle section of the associated turning tool.

10. The automatic steel-bar coupling head making machine according to claim 9, wherein each of the driving rotating discs has a plurality of first tooth parts disposed on a second surface thereof, and each main seat body has at least one adjustment member pivotally connected with the peripheral edge thereof, and wherein each of the at least one adjustment members has a first end exposed out of the peripheral edge of the associated main seat body and a second end inserted into the assembly groove of the associated main seat body, and each of the at least one adjustment members has a plurality of second tooth parts corresponding in position to the first tooth parts of the associated driving rotating disc, so that the associated driving rotating disc can be rotated simultaneously when the at least one adjustment member is rotated.

11. The automatic steel-bar coupling head making machine according to claim 10, wherein side surfaces of the plurality of turning tool installation portion of the second turning mechanism facing the accommodating hole are inclination surfaces, and there is an inclined angle between an axial direction of the main seat body of the second turning mechanism and each of the inclination surfaces.

12. The automatic steel-bar coupling head making machine according to claim 10, wherein side surfaces of the plurality of turning tool installation portion of the second turning mechanism facing the accommodating hole are straight surfaces, and the straight surfaces are parallel with the axial direction of the main seat body of the second turning mechanism.

* * * * *